United States Patent [19]
Kelley et al.

[11] Patent Number: 5,808,627
[45] Date of Patent: Sep. 15, 1998

[54] METHOD AND APPARATUS FOR INCREASING THE SPEED OF RENDERING OF OBJECTS IN A DISPLAY SYSTEM

[75] Inventors: Michael W. Kelley, San Mateo; Kirk B. Gould, Sunnyvale, both of Calif.

[73] Assignee: Apple Computer, Inc., Cupertino, Calif.

[21] Appl. No.: 232,831

[22] Filed: Apr. 22, 1994

[51] Int. Cl.$^6$ .................................................. G06T 11/00
[52] U.S. Cl. ............................................................ 345/441
[58] Field of Search ............................ 395/141, 118, 395/119, 121–22, 162–166, 133, 501–506, 515–518, 522–526, 441; 345/441

[56] References Cited

U.S. PATENT DOCUMENTS

| | | | |
|---|---|---|---|
| 4,594,673 | 6/1986 | Holly | 364/522 |
| 4,658,247 | 4/1987 | Gharachorloo | 340/747 |
| 4,697,178 | 9/1987 | Heckel | 340/729 |
| 4,815,009 | 3/1989 | Blatin | 364/518 |
| 4,837,447 | 6/1989 | Pierce et al. | 250/492.2 |
| 4,866,637 | 9/1989 | Gonzalez-Lopez et al. | 364/518 |
| 4,885,703 | 12/1989 | Deering | 364/522 |
| 4,897,803 | 1/1990 | Calarco et al. | 364/518 |
| 4,945,500 | 7/1990 | Deering | 364/522 |
| 5,001,651 | 3/1991 | Rehme et al. | 364/518 |
| 5,029,105 | 7/1991 | Coleman et al. | 395/515 |
| 5,115,402 | 5/1992 | Matsushiro et al. | 395/141 |
| 5,123,085 | 6/1992 | Wells et al. | 395/121 |
| 5,128,872 | 7/1992 | Malachowsky et al. | 395/162 |
| 5,157,388 | 10/1992 | Kohn | 340/800 |
| 5,170,468 | 12/1992 | Shah et al. | 395/166 |
| 5,214,753 | 5/1993 | Lee et al. | 395/125 |
| 5,222,204 | 6/1993 | Swanson | 395/127 |
| 5,226,147 | 7/1993 | Fujishima et al. | 395/425 |
| 5,249,264 | 9/1993 | Matsumoto | 395/134 |
| 5,253,335 | 10/1993 | Mochizuki et al. | 395/122 |
| 5,261,041 | 11/1993 | Susman | 395/152 |
| 5,268,995 | 12/1993 | Diefendorff et al. | 395/122 |
| 5,274,760 | 12/1993 | Schneider | 395/162 |
| 5,278,949 | 1/1994 | Thayer | 395/126 |
| 5,287,487 | 2/1994 | Priem et al. | 395/425 |
| 5,307,449 | 4/1994 | Kelley et al. | 395/119 |
| 5,402,147 | 3/1995 | Chen et al. | 345/115 |
| 5,421,028 | 5/1995 | Swanson | 395/163 |
| 5,457,482 | 10/1995 | Rhoden et al. | 395/201 |

OTHER PUBLICATIONS

J.D. Foley, A. Van Dam, S.K. Feiner, J.F. Hughes, "Second Edition Computer Graphics Principles And Practice". 1990, pp. 885,886, 899, 900.

L.Williams, "Pyramdial Parmidal Parametrics", Computer Graphics, vol. 17, No. 3, Jul. 1983, pp. 1–11.

M.Oka, K. Tsutsui, A.Ohba, Y.Kurauchi, T. Tago, "Real-Time Manipulation of Texture–Mapped Surfaces", Computer Graphics, vol. 21, No. 4, Jul. 1987, pp. 181–188.

M.Deering, S. Winner, B.Schediwy, C.Duffy, N.Hunt, "The Triangle Processor and Normal Vector Shader: A VLSI System for High Performance Graphics", Computer Graphics, vol. 22, No. 4, Aug. 1988, pp. 21–30.

D.Kirk, D. Voorhies, "The Rendering Architecture of the DN10000VS", Computer Graphics, vol. 24, No. 4, Aug. 1990, pp. 299–307.

H.Fuchs, J.Poulton, J.Eyles, T.Greer, J.Goldfeather, D.Ellsworth, S.Molnar, G.Turk, B.Tebbs, L. Israel. "Pixel–Planes 5: A Heterogeneous Multiprocessor Graphics System Using Processor–Enhanced Memories", Computer Graphics, vol. 23, No. 3, Jul. 1989, pp. 79–88.

(List continued on next page.)

*Primary Examiner*—Almis R. Jankus
*Attorney, Agent, or Firm*—Blakely, Sokoloff, Taylor & Zafman

[57] ABSTRACT

A method for providing objects to a rendering circuit. The method comprises the steps of: generating an active list, the active including a first subset of the objects; accessing the first subset of objects from the first memory; storing the first subset of objects in a second memory, the second memory having a faster access time than the first memory, and providing the active list to the rendering circuit.

23 Claims, 9 Drawing Sheets

OTHER PUBLICATIONS

K.Akeley, T.Jermouluk, "High–Performance Polygon Rendering", Computer Graphics vol. 22, No. 4, Aug. 1988, pp. 239–246.

Burgoon, Dave, "Pipelined Graphics Engine Speeds 3–D Image Control", *Electronic Design* , No. 17, Jul. 23, 1987, pp. 143–146,148,150.

Dowdell, Casey et al., "Scalable Graphics Enhancements for PA–RISC Workstations", Feb. 24–28, 1992 Spring COMPCON 92, Thirty–Seventh IEEE Computer Society International Conference, pp. 122–1278.

Grimes, J., "The Intel i860 64–Bit Processor: A General–Purpose CPU with 3D Graphics Capabilities", IEEE Computer Graphics and Applications, Jul. 9, 1989, No. 4, pp. 85–94.

PCT Written Opinion, PCT/US95/04795, Apr. 2, 1996.

METHOD AND APPARATUS FOR INCREASING THE SPEED OF RENDERING OF OBJECTS IN A DISPLAY SYSTEM

BACKGROUND OF THE INVENTION

1. Field of Invention

The present invention relates to the field of image display in a computer system. In particular, the present invention relates to the field of scanline rendering of objects to generate the image.

2. Description of Related Art

As the processing capability of computer systems has grown, the need for more complex and better graphical representation of images has also grown. Many vocations use computer system as a fundamental tool. For example, in the area of architectural design, three dimensional (3D) graphical images of building, or other structures, can be dynamically created and manipulated using computer systems. The computer system can capture, and process, the necessary image data much faster than can be done manually. As computer hardware technology advances, so has the development of various techniques for rapidly displaying, and manipulating, these images.

A 3D image is represented in a computer system as a collection of graphical objects. A computer system displays these objects on a display device (for example, a cathode ray tube (CRT)). All the objects are processed by the computer system, and some of them are displayed on the display device. The reason that only some of objects are displayed is that only some of the them can be seen from a given viewpoint. The computer decides which objects can be seen from a particular viewpoint using each object's depth parameters. In displaying hundreds, or thousands of objects, to make a single image, it is clear that the computer system performs an enormous number of calculations.

Computer graphics systems typically include a display control, and a display device. The display control often includes a frame buffer. The frame buffer is a digital memory for storing the image to be displayed as a series of binary values. The display device includes a screen having an array of picture elements, known as pixels. Each pixel represents a dot on the screen, and each pixel can be programmed to a particular color or intensity. Thousands of individual pixels, so programmed, are used to represent a displayed image. It is these individual pixel values which are stored in the frame buffer. A display controller reads the data from the frame buffer and converts it into a video signal. The video signal is fed to the monitor which displays the image.

Images are repeatedly rendered into the display over and over again, with each new frame representing a new position or shape of the image to be viewed. Rendered means creating a pixel representation of something. The image must be repeatedly sent to the monitor in order to maintain a steady picture on the screen. Due to characteristics of the human eye, the monitor needs to be refreshed at a minimum of 30 times a second. Otherwise, the display will flicker in a very annoying and distracting manner. In today's computer graphics systems, the refresh frequency is typically around 72 hertz (i.e., 72 times a second). A faster refresh rate produces less flicker. Hence, the duration for displaying an image is relatively small, approximately 1/72 of a second or 14 milliseconds. Given these constraints, it is imperative to speed up the graphics drawing process to avoid sluggish response times and jerky movements of displayed images. Moreover, the faster an image can be drawn, the more information which can be provided to the display. This results in smoother, more dynamic, and crisper images.

FIG. 1a illustrates an object that can be displayed by a computer system. Typically, the objects are polygons, and typically, the polygons are triangles. In this example, triangle 101 has three vertices: vertex A 102; vertex B 103; and vertex C 104. For the purposes of illustration, a triangle is used throughout this description, however, it should be noted that any object capable of being represented on a computer display can be used.

One technique for displaying triangle 101 is called scanline rendering. A display comprises a number of scanlines. Each scanline is the width of a pixel on the display. Most computer displays have hundreds of scanlines and display hundreds of thousands of pixels. In scanline rendering, a computer display image is created one scanline at a time. Therefore, for each scanline, all the objects that have a portion to be displayed on that scanline are rendered. These objects are said to be active for that scanline.

FIG. 1b illustrates the triangle of FIG. 1a as it would be scanline displayed. Triangle 101 is mapped to the display scanlines 105–111. Thus, for each scanline 105–111, some pixels will be displayed that represent triangle 101. Triangle 101 is said to be active for scanlines 105–111. That is, for each of those scanlines, it must be determined if some portion of triangle 101 must be displayed. For example, a rendered scanline 108 includes pixels 109 representing a portion of triangle 101.

In this example, scanline 108 could include portions, or all, of other objects. Remember that only objects, that are not blocked by other objects, and are active for a particular scanline, will be rendered on that scanline. Therefore, there can be many active objects for a scanline, but only the objects that can be seen will be rendered for that scanline.

FIG. 2 is a flowchart illustrating a scanline method for rendering an image. At step 201, all the image's objects are sorted in order of their activation scanline. An activation scanline is the first scanline that an object. Scanlines are typically counted from 0, where 0 is the top scanline of the display. Thus, in the previous example, triangle 201's activation scanline will be scanline 105. The next step 202 is to build the active object list for the first scanline to be rendered. This active object list contains all the objects that are active for the first scanline. At step 203, the first scanline is rendered.

At step 204, if not all the scanlines have been rendered, then at step 205, the active object list is updated for the next scanline. That is, the first scanline's active objects, that are not active for the second scanline, are removed from the list; the objects not active for the first scanline, but that are active for the second scanline, are added to the list, and the objects that are active for both the first and second scanlines remain in the list. After updating the active object list, the next scanline is rendered at step 203. Steps 203–205 are repeated until all the scanlines for the display have been rendered.

Note, for simplicity throughout this description, each list can be thought of as comprising a set of zero or more objects. However, in practice, each list may only contain a reference to zero or more objects. One skilled in the art will understand when a list contains only references to objects, and when a list contains the objects themselves.

FIG. 3a illustrates an object activation list as used in step 201 of the scanline method of FIG. 2. In this image, triangle A 321, triangle B 322 and triangle C 323 make up an image to be displayed. Each triangle has an activation scanline. Triangle A, determined by vertex 326, has an activation scanline of 5. Triangle B, determined by vertex 324, has an activation scanline of 1. Triangle C, determined by vertex 325, has an activation scanline of 1. From these activation scanlines, the object activation list 329 can be generated. Thus, for the object activation list entry corresponding to scanline 0, no objects are listed. For the entry corresponding to scanline 1, B 322 and C 323 are listed, shown as entry 327. No objects are listed for entries 2–4. For the entry 328 corresponding to scanline 5, triangle A 321 is listed. No objects are listed for entries 6–8.

FIG. 3b illustrates the active object list status 340 for each scanline rendered from the FIG. 3a example. Note that only one active object list is kept at any one time. Active object list 340 merely indicates the state of the active object list for each scanline as that scanline is rendered. At step 202, the active object list for scanline 0 is generated. The active object list is empty for rendering scanline 0 because no objects are active on that scanline. Thus, at step 203, no objects will be rendered for scanline 0. At step 204, the computer system determines that more scanlines need be generated. At step 205, the active object list is updated to include both triangles B 322 and C 323, shown as 341. Scanline 1 is then rendered using the objects in the active object list (B 322 and C 323). Steps 203–205 are repeated for scanlines 2–4. Note that the active object list does not change during these steps as both B 322 and C 323 are active for scanlines 2–4.

At step 205, in preparation for scanline 5 generation, the active object list is different, shown as 342. C 323 is not active for scanline 5, and is therefore removed from the list. However, A 321 becomes active on scanline 5, and is therefore added to the list. Scanline 5 is then rendered with objects B 322 and A 321.

At step 205, in preparation for scanline 6 generation, the activation list is changed, shown as 343. B 322 is not active for scanline 6, and is therefore removed from the list. Note that A 321 is still active, and is therefore left in the active object list. Not until the preparation of scanline 9, is A 321 removed from the active object list.

Thus, all the objects representing a computer image can be rendered. This rendering generates an entire computer display image, one scanline at a time.

FIG. 4 illustrates one prior art system for rendering objects on a display. Memory 410 stores the objects used to make the computer display image. This means that the objects in the object activation list are stored in the memory 410. These objects are communicated to an object access control 420 over memory bus 411. Object access control 420, and rendering circuit 430, perform steps 202–205. The object access control 420 maintains the active object list as each scanline is rendered. The object access control 420 also passes the objects in the active object list to rendering circuit 430. The object information is passed via the object bus 421. Rendering circuit 430 generates a scanline from the objects in each received active object list. Each generated scanline is passed to frame buffer 440 via rendered scanline bus 441. Display 450 displays the pixels stored in the frame buffer 440 to produce the computer display image.

To reduce the cost of the prior art system, memory 410 is typically Dynamic Random Access Memory (DRAM). One problem with this system is that DRAM has a relatively slow access time. The active list, passed to the rendering circuit, contains the information for all the objects in that list. For each scanline, the object access control 420 must access memory 410 for each object in the corresponding active object list. Therefore, the speed of these accesses to memory 410 are a limiting factor in prior art systems.

In a typical prior art system, each object, in the active list, requires approximately 100 bytes of memory. However, desirable quality computer graphics display can be achieved if 10 Mbytes/s of information transfer is sustained between object control access 420 and rendering circuit 430. This means that 10 Mbytes/s of active list objects is transferred to the rendering circuit 430. In this system, a similar information transfer rate between memory 410 and object access control 420, need be maintained, or a bottleneck occurs. That is, if memory 410 cannot supply 10 Mbytes/s to object access control 420, then the object access control 420 cannot maintain a supply of 10Mbytes/s to the rendering circuit. Therefore, in prior art systems, either higher cost components are used in memory 410, DRAM would not likely suffice, or the quality of the computer graphics is reduced. Neither of these solutions are particularly desirable. Therefore, what is needed is a system that provides low cost, quality computer graphics display. Further, what is needed is a scanline rendering system where the object memory access time does not act as a bottleneck to the rendering of objects. Also, what is desired is to be able to supply a scanline rendering circuit a large number of active objects while still using relatively low cost, but slow access, DRAM memory components to store the objects making up the computer display image.

An improved apparatus and method for rendering objects is needed.

SUMMARY OF THE INVENTION

An improved method and apparatus for rendering objects is described. One embodiment of the present invention allows objects to be stored in a fast memory to provide improved system performance while maintaining a low cost system. An active list of objects is generated. The list includes a first subset of objects that are stored in a first memory. The first subset of objects are accessed and are stored in a second memory, where the second memory has a faster access time than the first memory. The list is then provided to the rendering circuit. Note that because some of the objects are stored in the fast memory, if those objects are needed again, access to those objects will require much less time.

In another embodiment, the list includes a second subset of objects. The second memory includes the second subset of objects. The first subset of objects and the second subset of objects are provided to the rendering circuit. Note that the second subset of objects are provided from the faster second memory, providing better system performance.

In another embodiment, a second active list is generated. Objects included in the first active list, but not in the second active list are marked as no longer being used. This frees up storage in the second memory, for use by other objects.

In another embodiment, the first active list is generated, and the first subset of objects is accessed, while a next scanline is being rendered. This allows objects to be stored before they are needed. In another embodiment, the active list is provided while objects are being rendered in a present scanline.

In another embodiment, the address of each object is changed when it is stored in the second memory. To determine whether an object is stored in the second memory, an address comparison is performed.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

An improved apparatus and method for rendering objects is described. In the following description, numerous specific details are set forth such activation lists, cache control methods, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Computer System Overview

Figure 4:
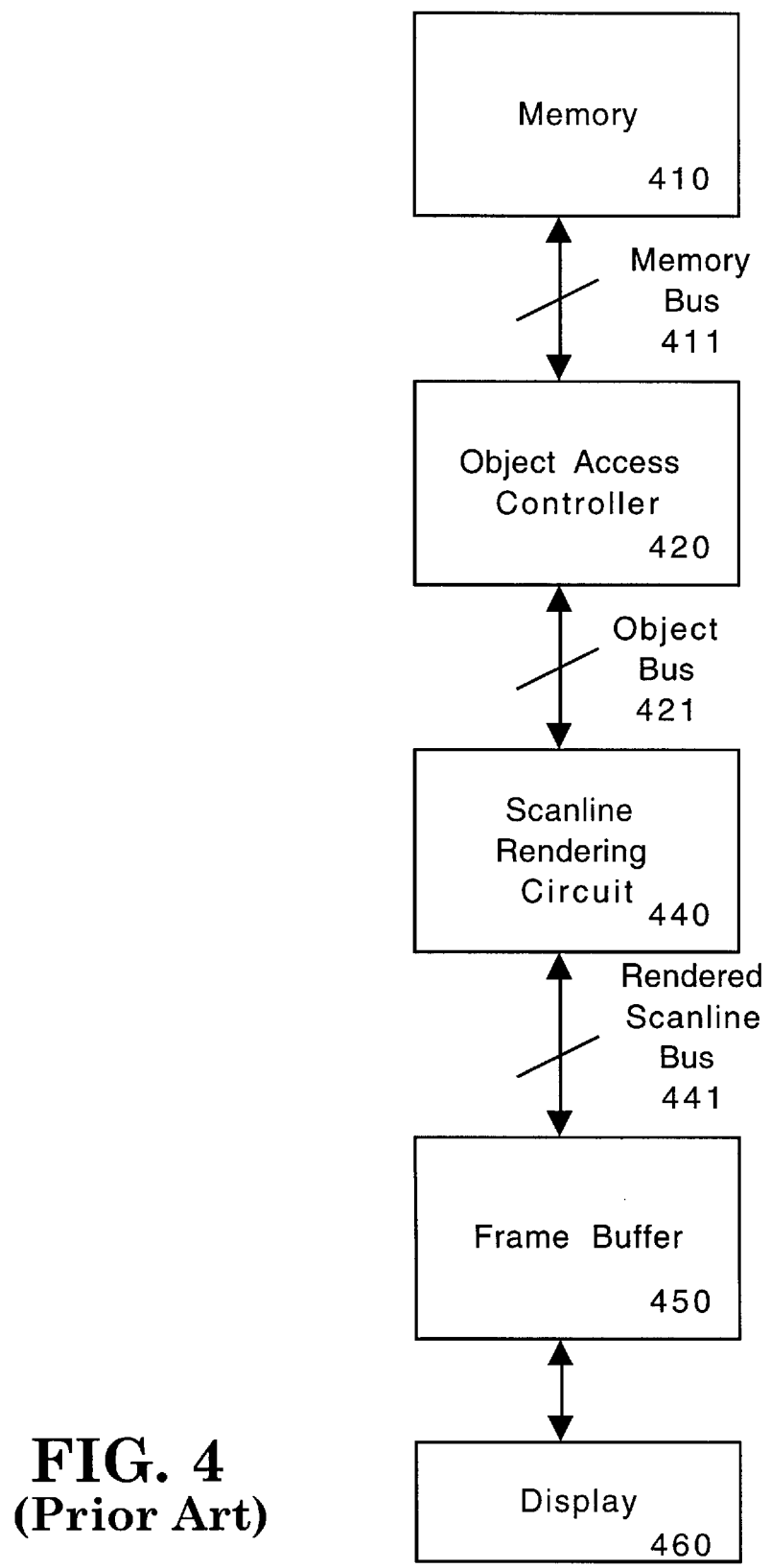
FIG. 4 illustrates a prior art system for the scanline rendering of objects.
Figure 5:
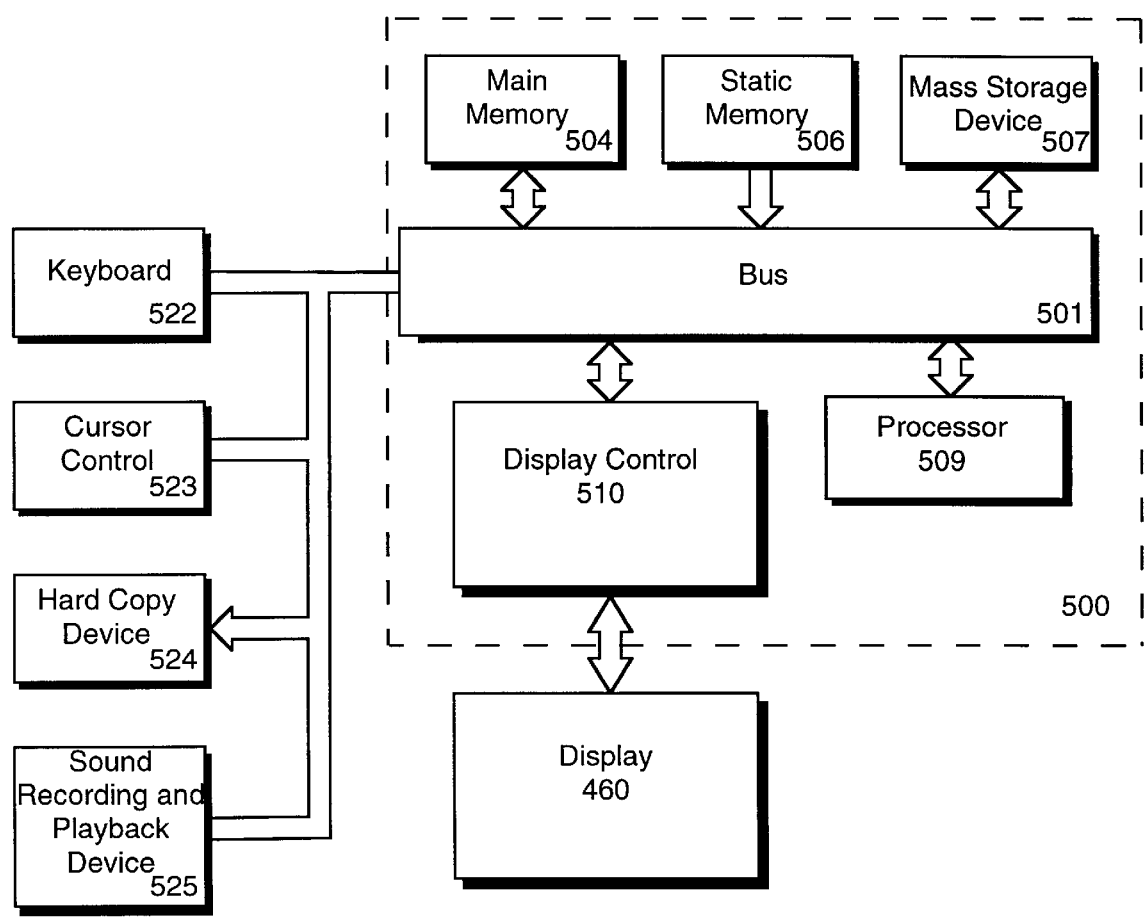
FIG. 5 illustrates a computer system in which the present invention may be implemented.

Referring to FIG. 5, the computer system upon which an embodiment of the present invention can be implemented is shown as 500. Computer system 500 comprises a bus 501, or other communications hardware and software, for communicating information, and a processor 509 coupled with bus 501 for processing information. System 500 further comprises a random access memory (RAM) or other dynamic storage device 504 (referred to as main memory), coupled to bus 501 for storing information and instructions to be executed by processor 509. Main memory 504 also may be used for storing temporary variables or other intermediate information during execution of instructions by processor 509. Computer system 500 also comprises a read only memory (ROM) 506, and/or other static storage device, coupled to bus 501 for storing static information and instructions for processor 509. Data storage device 507 is coupled to bus 501 for storing information and instructions. Data storage device 507 can be a magnetic disk or optical disk, and its corresponding disk drive, or any other storage medium. Memory 410, of FIG. 4, could include any, or all, of these types of memory/data storage devices. However, typically, memory 410 only includes the main memory 504.

Computer system 500 can also be coupled via bus 501 to display control 510. Display control 510 generates the necessary signal for display device 460 to display information to a computer user. Display control 510 can include a frame buffer, and specialized graphics rendering devices. Display 460 can include a cathode ray tube (CRT), and/or a flat panel display, or any other display device.

An alphanumeric input device 522, including alphanumeric and other keys, is typically coupled to bus 501 for communicating information and command selections to processor 509. Another type of user input device is cursor control 523, such as a mouse, a trackball, a pen, a touch screen, or cursor direction keys for communicating direction information and command selections to processor 509, and for controlling cursor movement on display 460. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker which is coupled to a digital to analog (D/A) converter for playing back the digitized sounds. Finally, computer system 500 can be a terminal in a computer network (e.g., a LAN).

A System for Caching Objects to be Rendered

As noted previously, what is needed is a system that provides low cost, quality computer graphics display. The present invention provides one solution to this problem. One embodiment allows a rendering circuit to render the objects in the active object list, without having significant impact from a slow object memory. It has been discovered that with little additional cost, the negative impact on performance of a DRAM's slow access time can be overcome.

Figure 6:
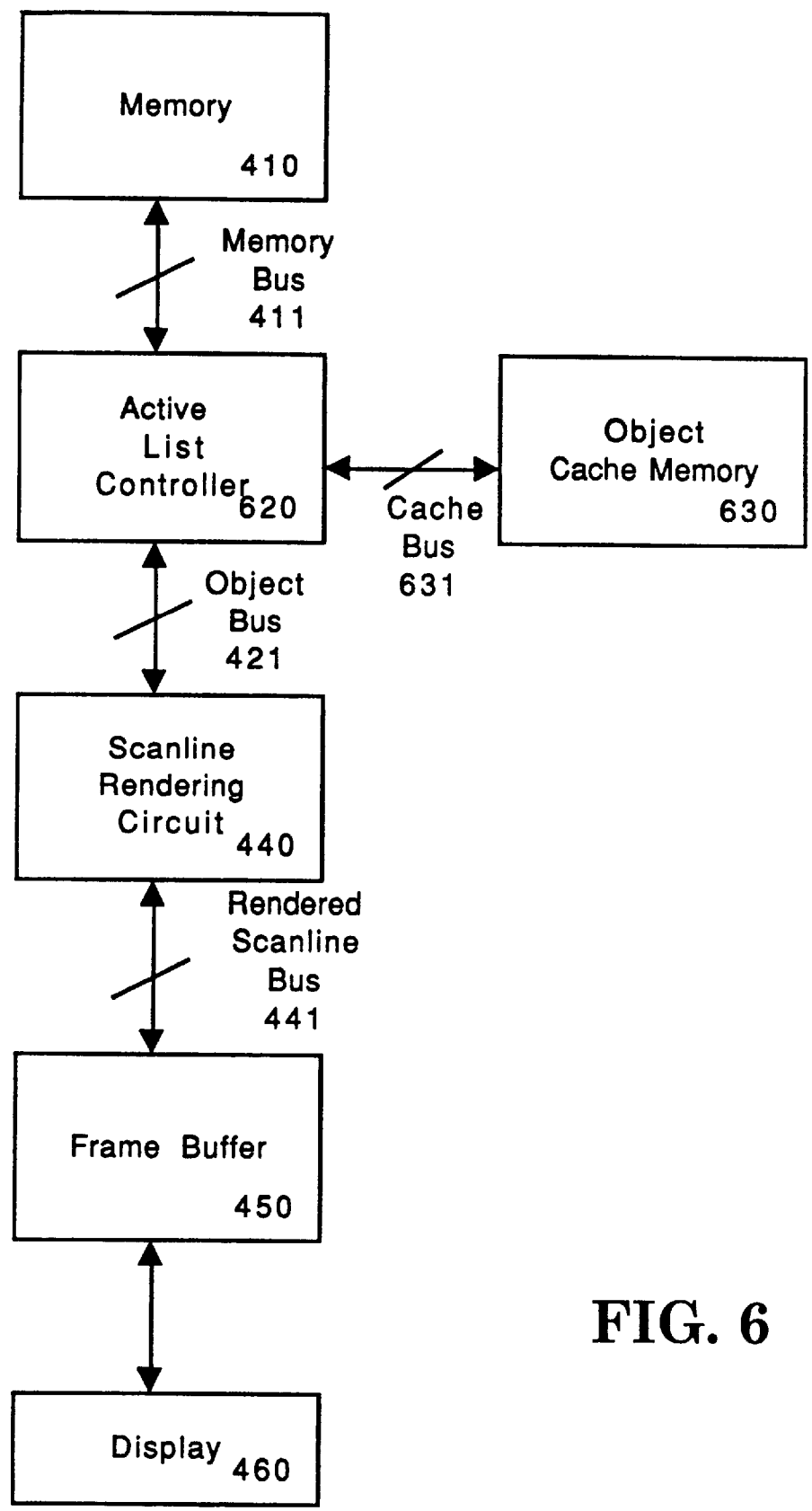
FIG. 6 illustrates a system for caching objects to be rendered.

FIG. 6 illustrates a general overview of one embodiment of the present invention. Memory 410 is coupled to active list controller 620. Object cache memory 630 is also coupled to the active list controller 620 via cache bus 631. The active list controller 620 provides the objects in an active list to the scanline rendering circuit 440, via object bus 421. It has been discovered that caching objects in the active list reduces the negative effects of slow access to memory 410. That is, by temporarily storing the objects, of the active objects list, in a much faster memory, a much higher communication rate of objects to the scanline rendering circuit can be sustained.

As mentioned previously, memory 410 can include any of a number of storage devices/media, all being able to store mass amounts of information at a relatively low cost. This means that hundreds, or thousands, of objects can be stored in memory 410. Further, memory 410 can store application programs for manipulating the objects, and for performing other system operations.

Figure 1A:
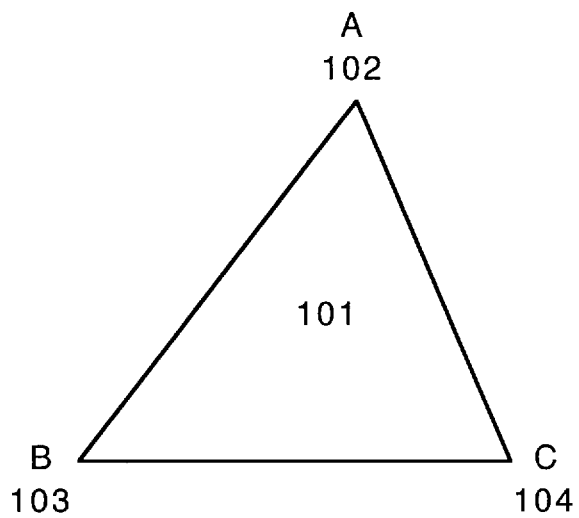
FIG. 1a illustrates an object that can be displayed on a computer display.
Figure 1B:
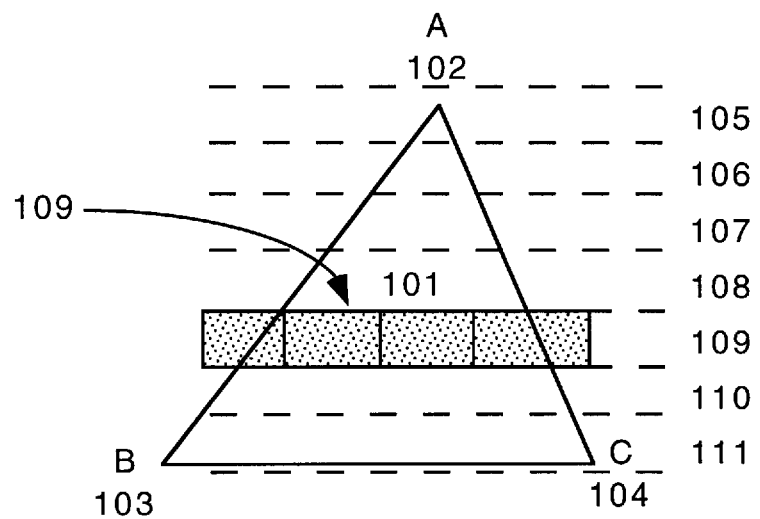
FIG. 1b illustrates the object of FIG. 1a mapped for display.
Figure 2:
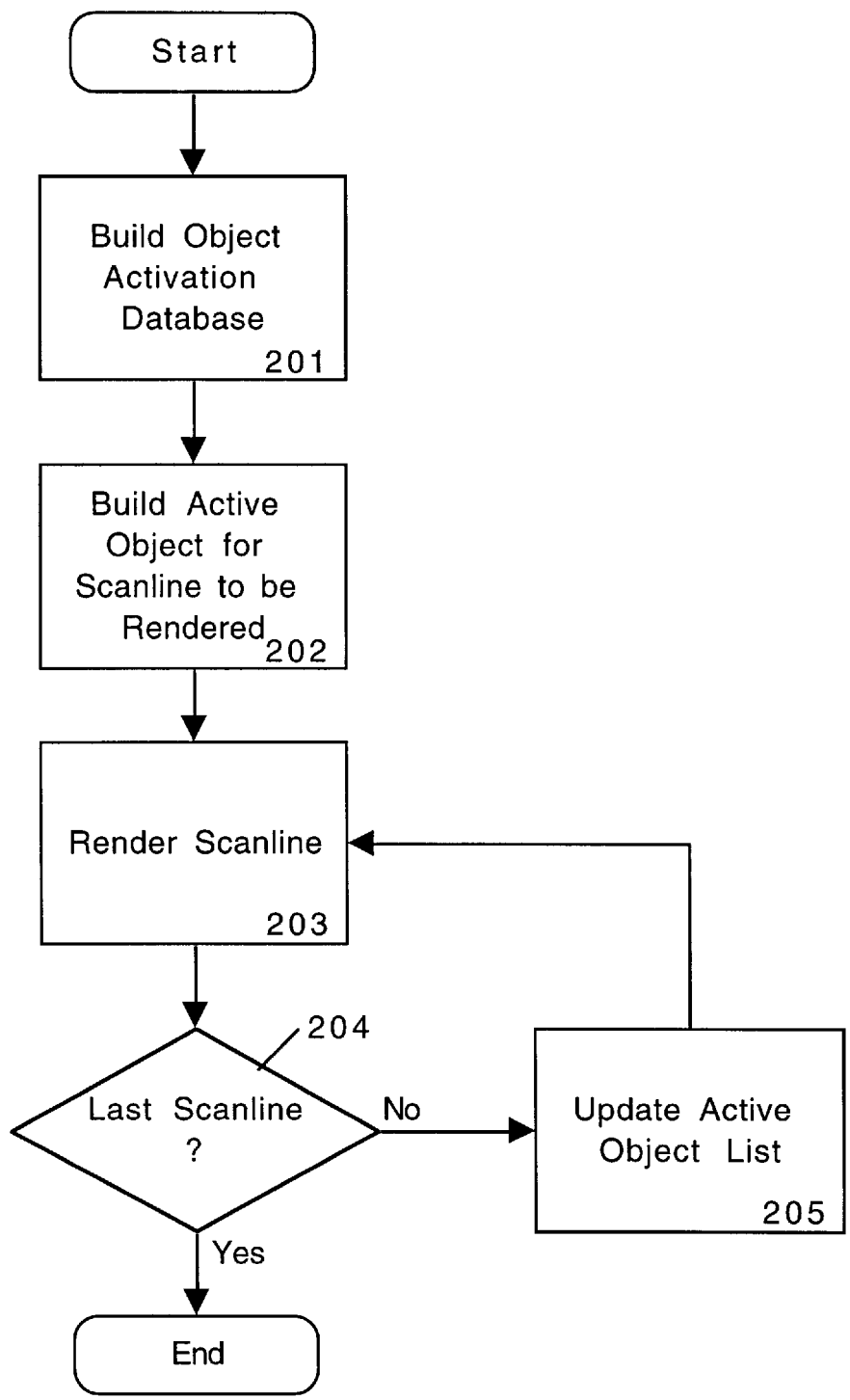
FIG. 2 is a flowchart illustrating a scanline method for rendering an image.
Figure 3A:
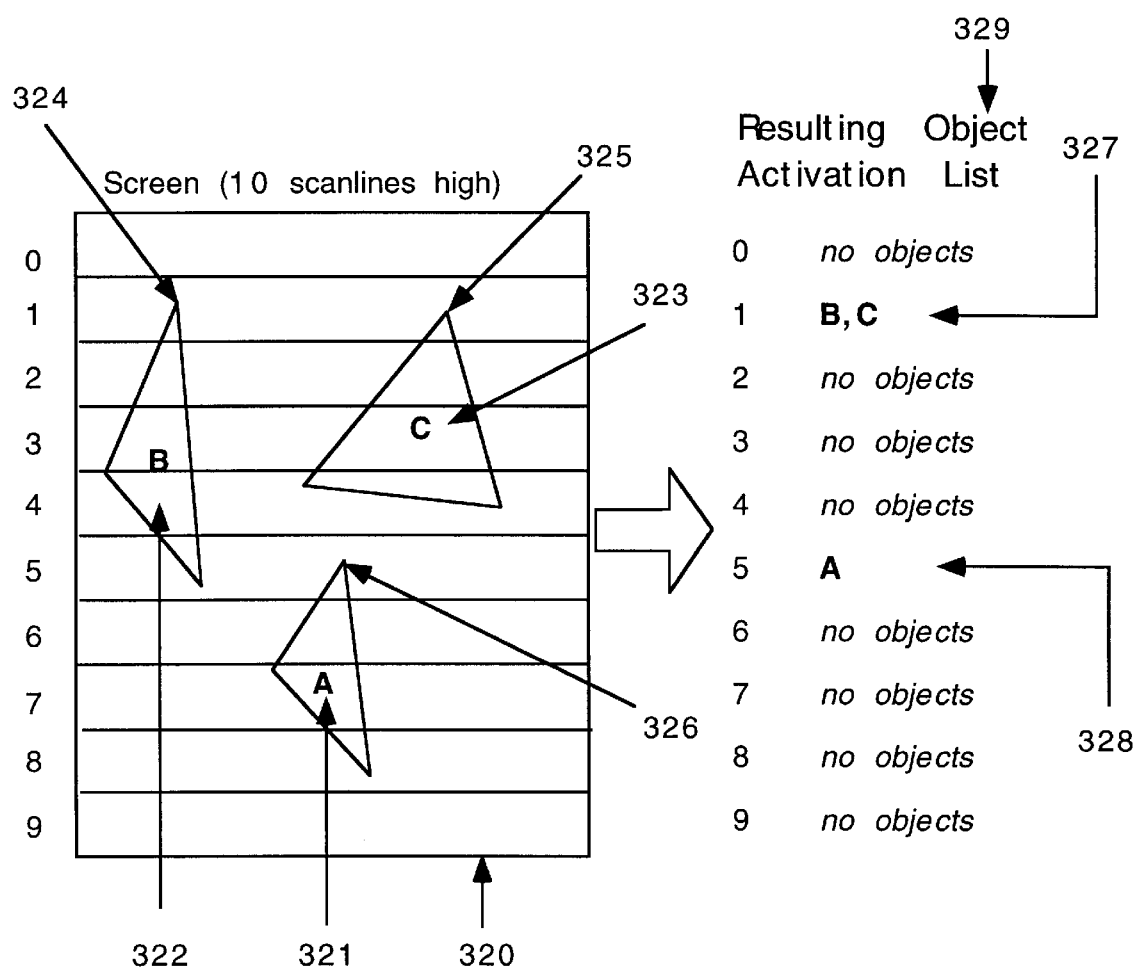
FIG. 3a illustrates an object activation list as used in the scanline method.
Figure 3B:
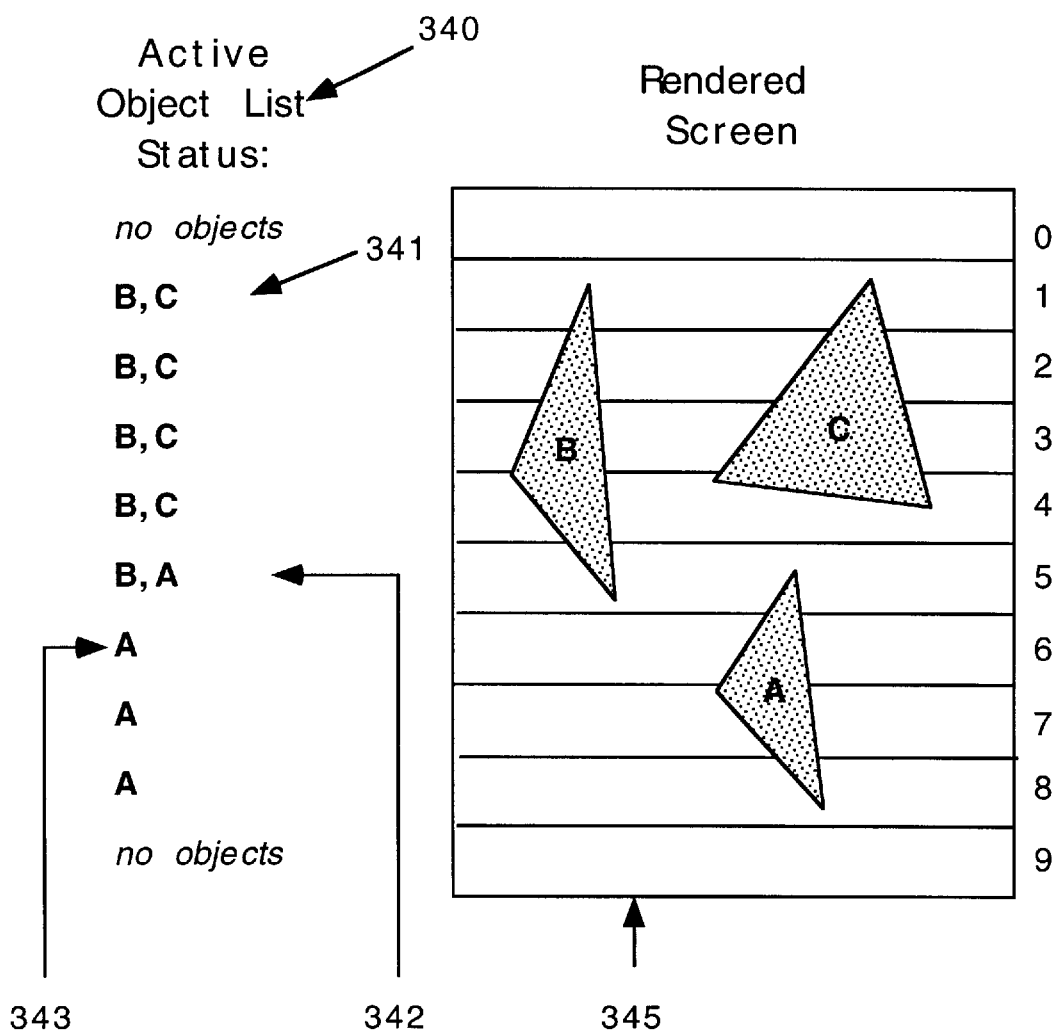
FIG. 3b illustrates the active object list status for each scanline rendered from the FIG. 3a example.

The following illustrates the operation of active list controller 620 and object cache 630. Assume that the objects of FIG. 3b are to be cached. To render scanline 0, the active list controller 620 need not provide any objects to scanline rendering circuit 440. Scanline rendering circuit 440 will produce scanline 0, with no portions of any objects represented, and pass this to frame buffer 450.

Next, scanline 1 is processed. The active list controller 620 adds objects B 322 and C 323 to it's active object list. As these objects are not cached in object cache memory 630, these objects are then requested from memory 410. When memory 410 provides objects B 322 and C 323, active list controller 620 provides B 322 and C 323 to the scanline rendering circuit 440. Note that until this point, this embodiment operates similarly to the prior art of FIG. 4. However the present embodiment now differs in that the active list controller 620 also stores B 322 and C 323 in object cache memory 630. The advantage of this will be seen in the rendering of the next scanline.

Scanline 2 is then processed. The active list controller 620 does not change the active object list because both B 322 and C 323 remain active for this scanline. The active list controller 620 then checks to determine whether the objects in the active object list have been cached. In this case, object cache memory 630 has B 322 and C 323 stored. The active list controller 620 retrieves B 322 and C 323 from object cache memory 630. Remember that object cache memory 630 is relatively small, but much faster than memory 410. Thus, for scanline 2, the active list controller 620 can provide B 322 and C 323 to scanline rendering circuit 440 in much less time than was required for scanline 1. For scanlines 3 and 4, the same steps are followed and B 322 and C 323 are provided in the much shorter time.

Scanline 5 is then processed. The active list controller 620 updates the active object list to that shown at 342. Active list controller 620 requests A 321 from memory 410. While memory 410 is processing the request, active list controller 620 can request B 322 and C 323 from object cache memory 630. In one embodiment of the present invention, B 322 and C 323 can be provided to scanline rendering circuit 440 while memory 410 is processing the request for A 321. In another embodiment of the present invention, active list controller 620 communicates the objects in the active object list in the same order as the objects appear in the list. In any case, the objects of active object list, at stage 342, can be provided to the scanline rendering circuit 440 in less time than the prior art system of FIG. 4. This is because only one object need be requested from slow memory 410. As with objects B 322 and C 323, the first time they are received from memory 410, they are stored in object cache memory 630.

Scanline 6 is then processed. Active list controller 620 updates the active list to the state shown at 343. The active list controller 620 determines that object cache memory 630 contains A 321, and accesses object cache memory 630. Again, because object cache memory 630 is accessed, rather than memory 410, active list controller 620 can communicate A 321 to scanline rendering circuit 440 in less time than is required by the prior art system. The remaining scanlines can then be rendered without having to access memory 410.

Note that when object cache memory 630 is full, any of a number of well known cache invalidation techniques can be used. These cache invalidation techniques free storage in the cache for use by other data. For example, the least recently used object in the cache can be replaced by an object received from memory 401, or a random object in object cache memory 630 can be replaced by an incoming object. However, as is discussed later, it has been discovered that a particular cache replacement system provides significant cache hit improvements. A cache hit occurs when a revised object is stored in the cache. This improved cache hit rate improves the performance of the system.

Thus, the FIG. 6 system can provide improved graphics display performance by reducing the number of accesses to memory 410 and thereby increase the number of objects that the system is capable of rendering. In one embodiment of the present invention, it has been discovered that using relatively small, fast memory components, in object cache memory 630, greatly improves the performance of the graphics display system.

In one embodiment of the present invention, memory 410 includes 16 Mbit, 80 ns DRAM. Object cache memory 630 is comprised of synchronous 32 Kbit×36, 12 ns SRAM (Micron MT 58LC32K26M1). The active list controller 620 includes special circuitry for controlling the caching of objects in the active object list to object cache memory 630. By caching the active object list, active list controller 620 can quickly access the objects most likely to be required by the scanline rendering circuit 440.

As is described further in this document, other inventive aspects of the implementation of the active list controller 620 and object cache memory 630, further increase the performance of the present embodiment.

Figure 7:
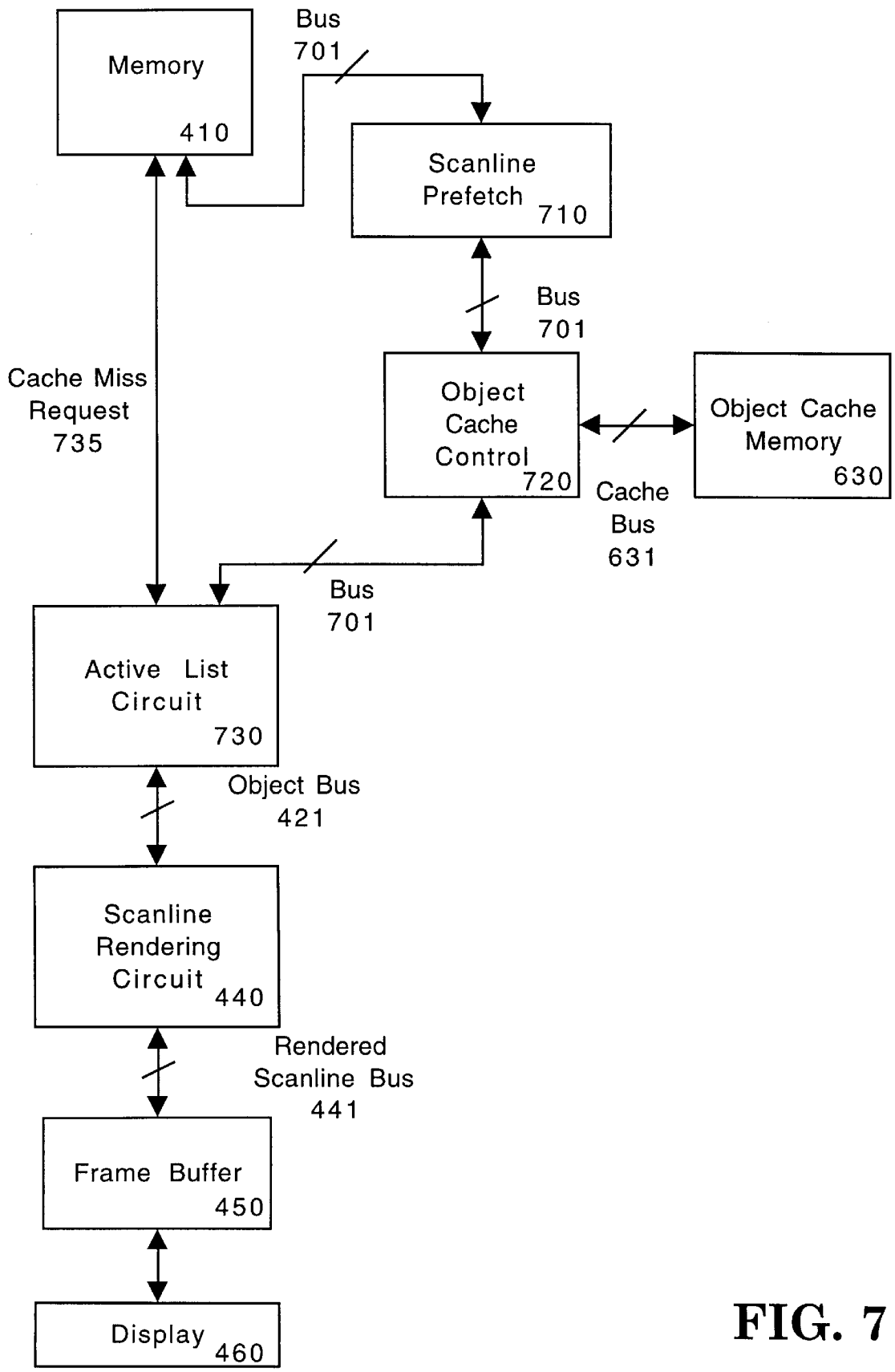
FIG. 7 illustrates a another embodiment of a system caching objects to be rendered.

FIG. 7 illustrates a view of another embodiment of the present invention. This embodiment prefetches objects one scanline before they are needed. This reduces the chance of an interruption of the rendering process, when an object is first accessed. This embodiment has further performance improvements over an embodiment that merely caches the active object list objects. For example, if scanline rendering circuit 440 is rendering scanline 4, then scanline prefetch 710 requests objects in scanline 5. This process is described in greater detail in relation to FIG. 8. By prefetching objects before they are needed, more objects can be rendered per scanline, improving the image displayed on display 460.

In this embodiment, the active list controller 620 has been replaced by a scanline prefetch 710, an object cache control 720, and an active list circuit 730. The scanline prefetch 710 is coupled to memory 410 via bus 701. The object cache control 720 is coupled to the scanline prefetch 710 via bus 701. The object cache control 720 is also coupled to object cache memory 630 via cache bus 631. Active list circuit 730 couples to the object cache control 720 via bus 701.

Scanline prefetch 710 maintains an active object list for the next scanline to be rendered. Scanline prefetch 710 also requests, via bus 701, objects contained in the active object list for the next scanline to be rendered.

Object cache control 720 is for controlling access to object cache memory 630. Object cache control 720 is also for storing an object received over bus 701 from memory 410 into object cache memory 630. Of course, object cache control 720 will only store a received object if there is room in object cache memory 630.

Active list circuit 730 is for maintaining the active object list for the present scanline. The active list circuit 730 provides the objects in the active list to scanline rendering circuit 440, for rendering of the present scanline. Active list circuit 730 requests the objects in the present active object list from object cache control 720. If an object is not stored in object cache memory 630, then active list circuit 730 requests the object from memory 410 via cache miss request 735. An object may not be in cache memory because, there are too many objects in the present scanline for them all to be stored in object cache memory, or because memory 410 could not provide all the prefetched objects in time.

In this system, each object is referenced by a particular address. In one embodiment of the present invention, traditional tags are used to reference cached data. Typically, cached data is associated with one or more tags. This allows easy indexing of data. However, it has been discovered that improved performance can be gained by not providing additional tags to reference objects stored in object cache memory 630. Thus, in another embodiment, no additional tags are needed in object cache memory 630. This allows more objects to be stored in object cache memory 630. A reference to an object, stored in object cache memory 630, is maintained by changing the address of that object as it is stored in object cache memory 630. The address of the object is changed such that each cached object will have an address not found in memory 410. This makes the test to determine whether a particular object is in the cache (called a cache hit test) a simple address comparison. Thus, to test if an object in the present scanline's active object list, active list circuit 730 need only test if that object's address is within a certain range.

A Method of Caching Objects to be Rendered

Figure 8:
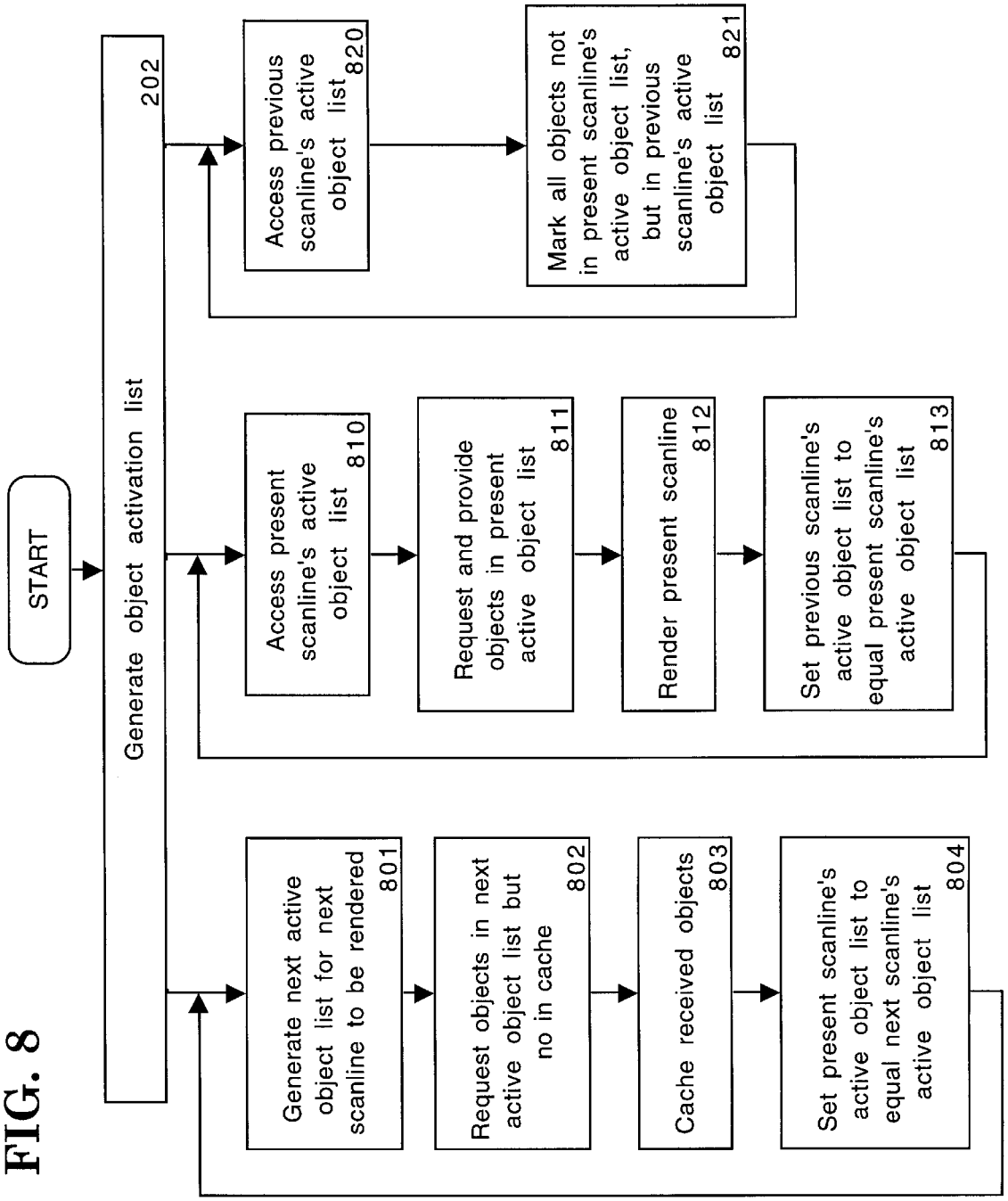
FIG. 8 is a flowchart illustrating a method of caching objects to be rendered.

FIG. 8 illustrates further advantages of the present invention. FIG. 8 illustrates a method of caching objects to be rendered. This method can be used in the embodiment of FIG. 7. As is discussed below, this method has the following advantages:

objects are moved from the slow memory to fast cache memory one scanline before they are required by the rendering circuits, this decouples the longer access time of slow memory from the rendering task;

a cached object is kept in the cache until all rendering references to have completed, thus, any modifications made to the object during the rendering procedure are made while the object is in the fast cache memory, rather than the slow memory, and objects are retained in the cache for exactly as long as they are active, therefore, the cache invalidation method provides more efficient cache use than other heuristics.

Like the prior art method, at step 202, the object activation list is generated for the image. However, the remaining steps differ considerably from the prior art, and provide the previously mentioned advantages. Steps 801–804 prefetch the objects in the next scanline's active object list. Steps 810–813 access the cache memory 630 to provide the scanline rendering circuit 440 the objects in the present scanline's active object list. Steps 820–821 mark objects in object cache memory 630 as being no longer needed, thereby freeing cache storage for other objects. Typically, the marked objects are not written back to memory 410. The marked objects are simply overwitten with new object information. This is because, once rendered, objects are usually discarded. The above groups of steps can run in parallel. One skilled in the art would understand how these steps can be run in parallel; therefore, to simplify the description of this embodiment, some details of the parallel operation have not been included.

Similarly, some detail regarding initialization and final completion steps of the method have not been included. One skilled in the art would understand how to implement these steps, given the description herein.

Beginning with the prefetching steps, step 801 generates the active object list for the next scan. For example, if scanline 4 were being rendered by scanline rendering circuit 440, at step 801, the active object list for scanline 5 would be generated. Next, at step 802, the objects in the next active object list, but not already in object cache memory 630, are requested. In one embodiment, scanline prefetch 710 performs steps 801 and 802. While performing step 802, scanline prefetch 710 determines whether each object in the next scanline's active object list is already stored in object memory cache 630 (in one embodiment, this test is done using a simple address comparison). For example, if prefetch circuit 710 is prefetching objects for scanline 5, then only object A 321 would be requested from memory 410, as objects B 322 and C 323 would already have been cached.

At step 803, objects received from memory 410 are stored in object cache memory 630. As mentioned previously, in one embodiment, object cache control 720 stores all objects, received from memory 410, in object cache memory 630. Of course, the object cache control 720 only stores these received objects if there is room in object cache memory 630.

At step 804, the present scanline's active object list is set to the next scanline's active object list. This allows the next scanline to be rendered. For example, if the next active object list for scanline 5 has been prefetched, in steps 801–804, then the present active object list for scanline 4 has been rendered, in steps 810–813. Thus, the steps 810–813 can be performed for scanline 5.

While the prefetching steps are being performed, the present scanline is being rendered. At step 810, the present scanline's active object list is accessed. Next, step 811, all the objects in the present active object list are requested and then provided to the rendering device. In one embodiment, active list circuit 730 determines whether an object in the present scanline's active object list is in object cache memory 630. If the object is in the cache, then that object is accessed and provided to scanline rendering circuit 440. Note that because the prefetching steps had already prefetched the objects for the present scanline, only rarely will some of the objects not be in the cache. This allows the rendering of the present scanline to proceed without having to wait for slow memory 410 accesses. At step 812, the present scanline is rendered. Note that some of the present scanline can be rendered, step 812, while objects are being accessed, and provided, in step 811.

Another advantage of the present invention is illustrated where step 812 involves modifying an object. During rendering, an object may be modified, for example, to change it's associated linked list information. If the object were in slow memory, not only would the scanline rendering have to wait for an initial read from the memory, but any modifications to an object would require waiting for a write to the slow memory. In one embodiment, modifications to an object can be done by writing to the fast cache memory.

At step 813, the previous scanline's active object list is set to equal the present scanline's active object list. This allows objects no longer needed, to be marked as being no longer needed, thereby freeing up space in the cache memory.

At step 820, the previous scanline's active object list is accessed. Next, all the objects not needed to render future scanlines, are marked as being no longer needed. It has been discovered that these cache invalidation steps are more efficient than other cache invalidation schemes. Objects are retained in the cache for exactly as long as they are needed. For example, if the previous scanline is 5, i.e. scanline 6 is presently being rendered, then B 322 will be have been completely render. Therefore, B 322 will no longer be needed, and the room in the cache can be freed for other objects.

Another advantage of the use of steps 820–821 occurs when the present scanline incurs a cache miss. In the rare circumstances of a cache miss, slow memory must be accessed to obtain the required object. However, because slow memory is being accessed, some objects may be marked as no longer needed, in step 821. Therefore, when slow memory returns the needed object, there may be room in the cache to store that object.

Thus, it has been shown that steps 801–804, 810–813, and 820–821, can efficiently render objects in a system having relatively slow memory. Further, a number of discoveries have lead to performance improvements in the scanline rendering of graphical images.

An improved apparatus and method for rendering objects has been described.

What is claimed is:

1. A method for providing objects to be rendered to a rendering circuit for subsequent display on a display device, said method comprising the steps of:
   a) generating an active list of objects to be displayed, said active list including a first subset of said objects;
   b) configuring a first memory to store said first subset and a second memory to selectively store said first subset, said second memory having a faster access time than said first memory;
   c) determining if said first subset is stored in said second memory;
   d) if said first subset is not stored in said second memory, then accessing said first subset from said first memory and storing said first subset in said second memory;
   e) if said first subset is stored in said second memory, then accessing said first subset from said second memory; and
   f) inputting said active list that includes said accessed first subset to said rendering circuit.

2. The method of claim 1 wherein said steps of generating said active list, determining if said first subset is stored in said second memory accessing said first subset of objects, and storing said first subset of objects, occur while said rendering circuit is rendering objects of a next scan line.

3. The method of claim 2 wherein said step of inputting said active list occurs while said rendering circuit is rendering objects of a present scanline.

4. The method of claim 1 wherein said objects include triangles.

5. The method of claim 1 wherein said first memory includes dynamic random access memory (DRAM).

6. The method of claim 1 wherein said second memory includes static random access memory (SRAM).

7. A method for providing objects to be rendered to a rendering circuit for subsequent display on a display device, said method comprising the steps of:
   a) generating an active list of objects to be displayed, said active list including a first subset of said objects and a second subset of objects;
   b) configuring a first memory to store said first subset and a second memory to selectively store said first subset, said second memory having a faster access time than said first memory, said second memory further configured to store said second subset;
   c) determining if said first subset is stored in said second memory;
   d) if said first subset is not stored in said second memory, then accessing said first subset from said first memory and storing said first subset in said second memory and accessing second subset from said second memory;
   e) if said first subset is stored in said second memory, then accessing said first subset and second subset from said second memory; and
   f) inputting said active list to said rendering circuit, wherein said step of inputting said active list to said rendering circuit includes inputting said first subset of objects and said second subset of objects.

8. A method for providing objects to be rendered to a rendering circuit for subsequent display on a display device, said method comprising the steps of:
   a) generating a first active list of objects to be displayed, said first active list including a first subset of said objects;
   b) configuring a first memory to store said first subset and a second memory to selectively store said first subset, said second memory having a faster access time than said first memory;
   c) determining if said first subset is stored in said second memory;
   d) if said first subset is not stored in said second memory, then accessing said first subset from said first memory and storing said first subset in said second memory;
   e) if said first subset is stored in said second memory, then accessing said first subset from said second memory;
   f) inputting said first active list to said rendering circuit;
   g) generating a second active list;
   h) generating a set of no longer used objects including all objects included in said first active list, but not included in said second active list; and
   i) marking each of said set of no longer used objects stored in said second memory.

9. A method of providing a present active list set of objects to be displayed to a rendering circuit in a computer system for subsequent display on a display device, said computer system for displaying a plurality of scanlines, said method comprising the steps of:
   a) generating a next active list, said next active list including objects to be rendered in a next scanline;
   b) generating a next active list subset of objects including objects in said next active list that are not stored in a fast memory;
   c) accessing said next active list subset of objects from a slow memory;
   d) storing said next active list subset of objects in said fast memory;
   e) accessing said present active list set of objects, said present active list set of objects including objects to be rendered in a present scanline;
   f) inputting said present active list set of objects to said rendering circuit;
   g) generating a no longer needed list of objects, said no longer needed list of objects including objects not needed in said present or next scanlines, and
   h) marking each object in said no longer needed list of objects in said fast memory as being no longer needed.

10. The method of claim 9 wherein each of said objects includes an address, and said storing step includes modifying the address of each object being stored.

11. The method of claim 10 wherein said generating said next active list subset includes the step of testing the address of each object to determine whether each object stored in said fast memory.

12. The method of claim 11 wherein said step of accessing said present active list set of objects includes performing the following steps for each object:
   performing the following steps, if said object is not stored in said fast memory,
      requesting said object from a slow memory,
      providing said object from said slow memory, and
      storing said object in said fast memory if said fast memory can store said object, and
   performing the following steps, if said object is stored in a fast memory, providing said object from said fast memory.

13. A system for displaying objects on a display device, said system comprising:
   a) a first memory for storing a first set of said objects;
   b) a second memory for storing a second set of said objects, said second memory having a faster access time than said first memory;
   c) a first circuit for accessing a first active list of objects to be displayed, said first active list including an object from said second set of objects;
   d) a memory access circuit, being coupled to said first memory, said second memory, and said first circuit, for accessing said first memory and said second memory responsive to said first active list, and
   e) a rendering circuit being coupled to said memory access circuit for rendering said objects included in said first active list for subsequent display on the display device.

14. The system of claim 13 wherein said first active list includes an active set of objects.

15. The system of claim 14 wherein said memory access circuit includes:
   a second circuit, being coupled to said first memory and said second memory, for generating said first active list prior to said first circuit accessing said first active list, said first active list including a third set of objects, said second circuit further for requesting each object in said third set of objects, not included in said second set of objects, from said first memory.

16. The system of claim 15 wherein said memory access circuit includes:
   a third circuit, being coupled to said second memory and said second circuit, for storing each object from said first memory in said second memory, if said second memory has available storage.

17. The system of claim 13 wherein said memory access circuit includes:
   a marking circuit for accessing said first active list after said rendering circuit renders said objects included in said first active list, said first active list including a first subset of objects, said first subset of objects being completely rendered, said first marking list for marking said first subset of objects stored in said second memory.

18. A circuit for displaying objects on a display device, said circuit comprising:
   a) a slow memory configured to store a first object;
   b) a fast memory configured to store a second object;
   c) a prefetch circuit, configured to couple to said slow memory and to generate a next active list of objects to be displayed, said prefetch circuit further being configured to prefetch objects included in said next active list that are not stored in said fast memory;
   d) a fast memory control circuit, configured to couple to said prefetch circuit and said fast memory and to control said fast memory;
   e) an active list circuit, configured to couple to said fast memory control circuit and to access objects included in a present scanline;
   f) a scanline rendering circuit, configured to couple to said active list circuit, and to render said accessed objects provided by said active list circuit; and
   g) a frame buffer, configured to couple to said scanline rendering circuit and said display, said frame buffer configured to provide video information, corresponding to said rendered objects, to said display.

19. The circuit of claim 18 wherein said active list circuit is further for requesting present active list objects, not stored in said fast memory, from said slow memory, and said fast memory control circuit is further configured to store objects from said slow memory in said fast memory, if said fast memory has available storage locations.

20. The circuit of claim 19 wherein each object includes an address, and wherein said fast memory control circuit modifies each object's address before storing each object in said fast memory.

21. The circuit of claim 20 wherein said active list circuit also includes a previous active list, said active list circuit is for generating a subset of objects included in said previous active list, but not included in said present active list, and said active list circuit is for marking said subset of objects in said fast memory.

22. The circuit of claim 21 wherein said fast memory includes a SRAM.

23. The circuit of claim 22 wherein said slow memory includes a DRAM.

* * * * *